United States Patent [19]
Helfrich

[11] 3,791,721
[45] Feb. 12, 1974

[54] GOGGLES

[76] Inventor: James L. Helfrich, 4232 Hartel St., Philadelphia, Pa. 19136

[22] Filed: Oct. 4, 1972

[21] Appl. No.: 295,088

Related U.S. Application Data

[63] Continuation-in-part of Ser. No. 95,740, Dec. 7, 1970, abandoned.

[52] U.S. Cl............... 351/44, 2/14 G, 2/14 J, 2/14 K, 2/14 L, 2/14 N, 351/156
[51] Int. Cl........ G02c 7/10, G02c 3/00, A61f 9/02
[58] Field of Search... 351/44, 45, 46, 41, 111, 155, 351/156, 157; 2/14 G, 14 J, 14 K, 14 L, 14 N

[56] References Cited
UNITED STATES PATENTS
3,519,339   7/1970   Hutchinson et al................. 351/44

FOREIGN PATENTS OR APPLICATIONS
660,099    1/1964    Italy...................... 351/46
502,283    11/1954   Italy...................... 351/155
645,354    5/1937    Germany.............. 351/46
1,263,948  5/1961    France.................. 351/156

OTHER PUBLICATIONS
C. H. Swope et al., "Eye Protection Against Lasers," Applied Optics, Vol. 4, No. 5, May, 1965, pp. 523-526.

Primary Examiner—Paul A. Sacher
Attorney, Agent, or Firm—Edward J. Kelly; Herbert Berl; R. M. Lyon

[57] ABSTRACT

Compact eye goggles for protection against laser and other high intensity light radiation or energy and having a pair of eye cups which are worn without discomfort over the respective eye balls, lids and lashes of the eyes of the wearer. Should the user wear spectacles, the goggles are worn under the glasses. The cups introduce no distortion of the optical path and can be worn by people with various eye corrections. The cups are each partially hemispherical with rounded corners to snugly fit the user's face without interfering with vision, forward or peripheral.

5 Claims, 3 Drawing Figures

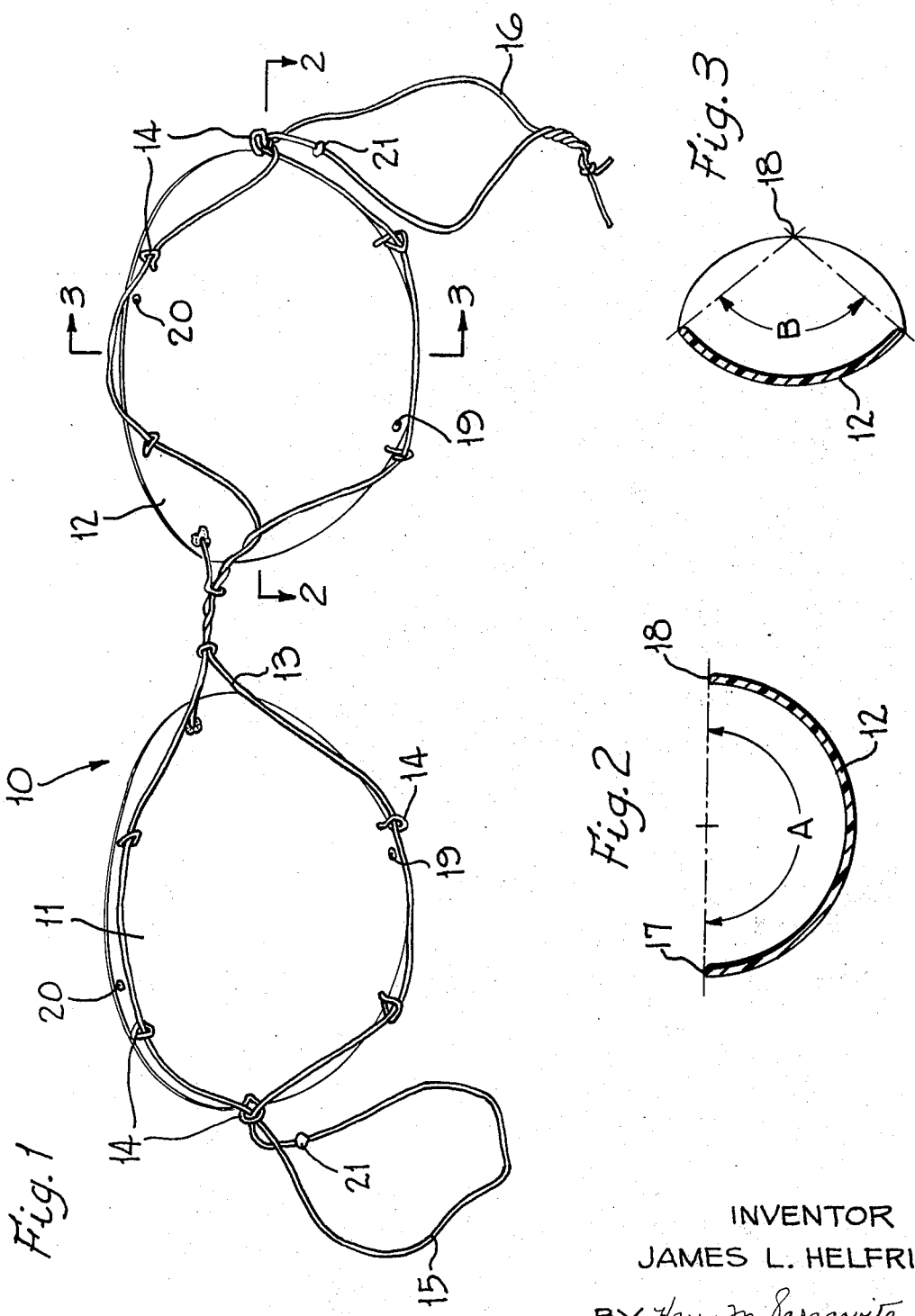

GOGGLES

This is a continuation-in-part of application Ser. No. 95,740, filed Dec. 7, 1970, now abandoned.

The invention described herein may be manufactured, used, and licensed by or for the Government for governmental purposes without the payment to me of any royalty thereon.

The invention relates to goggles and, more particularly, to eye protection goggles that prevents eye injury or damage in laser or other environments of high intensity light radiation or energy.

It is an object of the invention to provide light and compact eye protection goggles the use of which does not interfere with forward or peripheral vision of the wearer.

Another object of the invention is to provide such goggles which are adjustable to accommodate wearing or use on the face of a variety of individuals.

A further object of the invention is to provide such goggles in use of which fogging is relieved.

These and other objects, features and advantages will become more apparent from the following description and accompanying drawings in which:

FIG. 1 is a perspective view of a preferred goggle arrangement embodying the principles of the invention.

FIG. 2 is a sectional view taken along line 2—2 of FIG. 1.

FIG. 3 is a sectional view taken along line 3—3 of FIG. 1.

The inexpensive, light and compact goggle arrangement, shown generally at 10 (FIG. 1), includes a pair of optical material cup members 11, 12 with each cup being in the form of a hollow segmental portion of a hemisphere or a spherical surface. The cups may be formed of plastic or glass material that contains a laminate layer or coating of appropriate additive or dopant to cause reflection and/or absorption of intense light or optical energy at predetermined wave-lengths. The preferred cup material is polyvinyl chloride mixed with tris (p-diethylaminophenyl) aminium hexafluorantimonate (1), and dioctyl phthalate plasticizer, disolved in tetrahydrofuran and cast in 1/16 inch thick flat sheets. This material is used by Glendale Optical Company as the protective material in their Laser Gard Series of laser safety goggles. The cups are made from the 1/16 inch flat sheets by suitably clamping the material, softening it with heat, pressure sagging to a hemispheric shape, cooling, then cutting to shape. This cup material absorbs some portions of the intense laser light and reflects other portions of the laser light.

The cups are connected by a soft elastic cord or band 13 that is loosely threaded through a series of elevated eyelets 14 spacedly mounted on the external periphery of the cups. The ends of the cord 13 terminate in a pair of loops 15, 16 that facilitate attachment to or over the ears of the goggle wearer, and the cord and eyelet adjustable connection readily aids in closely positioning the cups comfortably over the wearer's eye balls, lids and lashes without interference therewith. The radius of curvature of the cups is of a predetermined dimension that approximates the distance from the curved or spherical segmental surface to the respective center of rotation of the wearer's eye balls. The radius of curvature of the cups should be in the range of 0.8 to 1.3 inches, with 1.1 inches preferred. Should the wearer or user wear spectacles, the goggles are worn under the glasses. The cups introduce no distortion of the optical path and can be worn by people with various eye corrections. The partially hemispherical cups have rounded corners at 17 and 18 (FIGS. 2, 3) to snugly fit the wearer's face without interfering with his vision, forward or peripheral.

Each of the segmental spherical cup portions has a major chordal length that subtends a central angle A (FIG. 2) in the range of 155° to 205°, preferably substantially 180° in which case the major chordal length would be equal to twice the radius of curvature of the spherical surface. Each cup major chordal length exceeds the respective minor chordal length oriented orthogonally thereto, the minor chordal length subtending a central angle B (FIG. 3) in the range of 80° to 125°, preferably substantially 100°.

Since the eye cups fit so snugly, when in use, the relative humidity of the air trapped between the corresponding cup and eye ball approaches 100 percent. As a result, fogging of the cups may result. To relieve this situation, the cups are each provided with tiny venting apertures 19, 20 located at predetermined points along its periphery. In addition the eyelets 14 may be hollow or tubular.

Each of the elastic cord end loops 15, 16 have an appropriate bead 21 of material threaded thereon to prevent the ear loops from slipping through the outermost eyelet.

I wish it to be understood that I do not desire to be limited to the exact details shown and described, for obvious modifications will occur to a person skilled in the art.

I claim:

1. An eye goggle for protection against laser and other optical radiation, comprising
   a pair of individual optical material segmental portions of a spherical surface, each of said segmental portions having a major chordal length in excess of a respective minor chordal length orthogonal thereto, said major chordal length approaching substantially twice the radius of curvature of said spherical surface, said material having means for absorbing intense light energy, and
   single elastic means connecting said segmental portions to each other and for attaching said segmental portions to predetermined objects, said elastic means being slidably secured to each of said spherical segmental portions, said connecting and attaching means includes means for adjustment of said spherical segmental portions relative thereto and to each other.

2. The structure in accordance with claim 1 wherein each of said segmental portions have a plurality of venting apertures located at predetermined points along its periphery and said absorbing means includes a dopant material.

3. The arrangement of claim 1 in which said connecting and attaching means includes an elastic cord, a plurality of elevated eyelets mounted on external peripheral portions of each segmental portion, said cord being threaded through said eyelets exclusively externally of said segmental portions and terminating in a pair of loop end attaching members, each of said attaching members having an enlargement thereon.

4. The arrangement in accordance with claim 1 wherein said major chordal lengths subtend an angle in the range of 155° to 205°, and said minor chordal lengths subtend an angle in the range of 80° to 125°.

5. The structure of claim 1 wherein said major chordal lengths subtend an angle of substantially 180° and said minor chordal lengths subtend an angle of 100°.

* * * * *